(12) United States Patent
Holmquist et al.

(10) Patent No.: US 7,023,829 B1
(45) Date of Patent: Apr. 4, 2006

(54) SYSTEMS AND METHODS FOR PROVIDING COMMUNICATION BETWEEN AN ATM LAYER DEVICE AND MULTIPLE MULTI-CHANNEL PHYSICAL LAYER DEVICES

(75) Inventors: Kurt Holmquist, Largo, FL (US); Ed Thoenes, St. Petersburg, FL (US)

(73) Assignee: Paradyne Corporation, Largo, FL (US)

( * ) Notice: Subject to any disclaimer, the term of this patent is extended or adjusted under 35 U.S.C. 154(b) by 966 days.

(21) Appl. No.: 09/871,351

(22) Filed: May 31, 2001

Related U.S. Application Data

(60) Provisional application No. 60/208,639, filed on Jun. 1, 2000.

(51) Int. Cl.
*H04Q 7/28* (2006.01)
*H04L 12/28* (2006.01)
*H04H 1/00* (2006.01)

(52) U.S. Cl. .................. 370/341; 370/230.1; 370/232; 370/235; 370/312; 370/395.43

(58) Field of Classification Search ................ 370/475, 370/230.1, 229, 230, 235, 389, 462, 465, 370/468, 471
See application file for complete search history.

(56) References Cited

U.S. PATENT DOCUMENTS 6,606,302 B1 * 8/2003 Delattre et al. .......... 370/230.1
6,718,419 B1 * 4/2004 Delvaux ..................... 710/305
6,721,323 B1 * 4/2004 Giszczynski et al. .... 370/395.1

* cited by examiner

*Primary Examiner*—Chi Pham
*Assistant Examiner*—Christopher P. Grey
(74) *Attorney, Agent, or Firm*—Thomas, Kayden, Horstemeyer & Risley, LLP

(57) ABSTRACT

Systems and methods are provided for providing communication between an ATM layer device and multiple multi-channel PHY layer devices, which increase the number of multi-channel PHY layer ports supported by the ATM layer device. In general, one such system comprises an ATM layer device that supports a plurality of ATM communication channels in which each of the plurality of ATM communications channels correspond to a first class of service or a second class of service, a plurality of physical layer devices each having a first channel port associated with the first class of service and a second channel port associated with the second class of service, and a local interface in communication with the ATM layer device and the plurality of physical layer devices for establishing a plurality of channel connections between each of the plurality of ATM communication channels and the first channel port and the second channel port in each of the plurality of physical layer devices, the local interface having a plurality of addresses. In the system, each of the plurality of channel connections associated with the plurality of second channel ports is via one of the plurality of addresses and at least two of the plurality of channel connections associated with the plurality of first channel ports is via no more than one of the plurality of addresses. In this manner, the system increases the number of physical layer devices communicating with the ATM layer.

59 Claims, 7 Drawing Sheets

SYSTEMS AND METHODS FOR PROVIDING COMMUNICATION BETWEEN AN ATM LAYER DEVICE AND MULTIPLE MULTI-CHANNEL PHYSICAL LAYER DEVICES

CROSS-REFERENCE TO RELATED APPLICATION

This application claims priority to copending U.S. provisional application entitled, "Technique for Expanding the Effective Number of PHY Ports Connected to an ATM Switching Device," having Ser. No. 60/208,639, filed Jun. 1, 2000, which is entirely incorporated herein by reference.

TECHNICAL FIELD

The present invention is generally related to data communication systems and methods, and more particularly, is related to systems and methods for providing data communication between an ATM layer device and multiple physical layer devices.

BACKGROUND OF THE INVENTION

Data communication systems are widely-known in the art. These systems enable heterogeneous computers to communicate with each other using a defined set of rules and message exchanges, known as data communication protocols. Data communication protocols are structured based on the concept of protocol layering. For instance, the data communication functions are partitioned into a hierarchical set of layers where each layer performs a related subset of the functions required to communicate with another system. Each layer relies on the next lower layer to perform more primitive functions and to conceal the details of those functions. Each layer also provides services to the next higher layer. Of course, it takes two to communicate, so the same set of layered functions must exist in two systems. Communication is achieved by having the corresponding or peer layers in two systems communicate using predefined protocols. For example, a well-known framework for defining standard data communication protocols is the Open Systems Interconnection (OSI) reference model, which was established by the International Organization for Standardization. In the OSI architecture, each system communicating with another system contains seven protocol layers: physical layer, data link layer, network layer, transport layer, session layer, presentation layer, and application layer.

A well-known suite of protocols used in many communications systems is based on asynchronous transfer mode (ATM). ATM is a well-known cell-oriented switching and multiplexing data communication technology that utilizes fixed-length packets or cells to carry different types of traffic. Each cell is 53 bytes in length and comprises a 5-byte header and a 48-byte payload. Each cell is switched and multiplexed throughout the ATM network based on the information contained in the header. The cell header identifies the destination of the cell, the cell type, and the cell priority. For example, the header comprises a virtual path identifier (VPI) field and a virtual channel identifier (VCI) field, which have local significance only and identify the destination of the cell. The header also comprises a generic flow control (GFC) field, which allows a multiplexer to control the rate of an ATM terminal. The header further comprises a payload type (PT) field, which indicates whether the cell contains user data, signaling data, or maintenance information and a cell loss priority (CLP) field, which indicates the relative priority of the cell. Using the CLP field, lower priority cells are discarded before higher priority cells during congested intervals. The header also comprises a cell header error check (HEC) field, which detects and corrects errors in the header. The payload field is passed through the network intact, with no error checking or correction. ATM relies on higher layer protocols to perform error checking and correction on the payload.

When using ATM, longer packets cannot delay shorter packets as in other packet switched implementations because long packets are divided into many fixed-length cells. This enables ATM to carry constant bit rate (CBR) traffic, such as voice and video, in conjunction with variable bit rate (VBR) data traffic, potentially having very long packets in the same network.

The two lowest protocol layers in the ATM protocol stack are the physical (PHY) layer and the ATM layer. The PHY layer provides for transmission of ATM cells over a physical medium that connects two ATM devices. The bits in the cells are transmitted over the transmission medium in a continuous stream. All information is switched and multiplexed in the ATM network in these fixed-length cells.

In ATM communication systems, the ATM layer provides the switching and multiplexing of virtual path connections (VPC) and virtual channel connections (VCC) between systems. Systems and methods for providing communication between an ATM layer device and multiple PHY layer devices are known in the art. For example, the Universal Test & Operations PHY Interface for ATM (UTOPIA) level 2 specification defines a standard data path interface between an ATM layer device and multiple PHY layer devices in an ATM communication system for communicating data in order to effectuate ATM network switching. The details of UTOPIA may be found in the ATM Forum Technical Committee document entitled "UTOPIA Level 2, Version 1.0 (af-phy-0039-00), which is entirely incorporated herein by reference.

The UTOPIA bus was originally conceived for use in ATM switching nodes within the ATM network where the total number of ports (PHY layer devices) is typically fairly small. Thus, the UTOPIA bus was designed with a five bit addressing scheme. Thus, the total number of PHY layer devices that can be connected to the standard UTOPIA bus is thirty-one, with one invalid address used in the polling discipline to indicate there is no address or no poll.

It is also known in the art to provide ATM communications via digital subscriber line (DSL) technologies. DSL technologies have become a widely-used solution for providing high bit rate transmission over the existing copper wire infrastructure, known as the "subscriber loop." DSL technologies dramatically improve the bandwidth of the existing analog telephone system. DSL enhances the data capacity of the existing copper wire that runs between the local telephone company switching offices and most homes and offices. The bandwidth of the wire has conventionally been limited to approximately 3,000 Hz due to its primary use as a voice telephone system. While the wire itself can handle higher frequencies, the telephone switching equipment is designed to cut-off signals above 4,000 Hz to filter noise off the voice line. DSL enables high-speed data traffic from a service provider network, such as an ATM network, to be provided on the existing wires with voice traffic.

In order to provide DSL service, a digital subscriber line access multiplexer (DSLAM) is employed at the local telephone company central office or digital loop carrier (DLC). The DSLAM includes frequency band filters to separate the voice-frequency traffic provided by the public-switched telephone network (PSTN) from the high-speed data traffic service provided by the network service provider. A DSLAM multiplexes the high-speed data traffic and routes it to subscribers on twisted-pair wires, referred to as a local loop. Many DSLAMs are designed to work with ATM networks.

Typically, a DSLAM includes an uplink interface, a switch concentration module (SCM), a backplane interface, and multiple line cards. High-speed data traffic from an ATM network is received by the uplink interface via multiple data communications channels. The high-speed data traffic is then transmitted to the SCM where it is transmitted to the backplane interface. The backplane interface provides the high-speed data traffic to multiple DSL ports in the line cards for subsequent delivery to subscribers.

One known type of DSL-based service is asymmetrical DSL (ADSL). ADSL is the most common DSL service. It is an asymmetrical technology, meaning that the downstream data rate is much higher than the upstream rate. The term upstream refers to data transfer toward the interior of the communication network. The term downstream refers to data transfer away from the interior of the communication network. In the context of a DSLAM and referring to the interface between the ATM layer device and DSL physical layer devices, the downstream direction corresponds to the transfer of cells from the ATM layer device to the physical layer devices for transmission over the DSL. The upstream direction corresponds to the transfer of cells received via the DSL from the physical layer devices to the ATM layer device. This type of service works well for providing typical Internet services to residential subscribers. ADSL operates in a frequency range that is above the frequency range of voice services, so the two systems can operate over the same subscriber cable.

For example, the ADSL standard of the International Telecommunications Union entitled "Recommendation G.992.1: Asymmetric Digital Subscriber Line (ADSL) Transceivers," which is entirely incorporated herein by reference, proscribes two types of channels to be carried simultaneously over the subscriber loop. One type of channel is characterized by a reduced error rate. This type of channel, however, does incur considerable delay because the forward error correction technique incorporates an interleaver. The other type of channel does not use the interleaver and thus has lower delay and a potentially higher error rate. The low-delay channel is considered more suitable for transporting real-time circuits, such as those carrying voice or real-time video, because real-time circuits are willing to accept some transmission errors in order to reduce delays. On the other hand, non-real-time circuits, such as those carrying data, are comparatively intolerant of errors because any single error requires retransmission of the entire block. Furthermore, circuits carrying data are not adversely effected by longer delays. Therefore, the low error rate channel is well-suited for carrying data circuits.

It may also be desirable to provide separate access means for real-time and non-real-time data paths in a variety of other situations. For example, if the data transmission technology employed in the physical layer device requires substantial local buffering of data, such as for half-duplex transmission, separate access for the real-time data may be necessary to prevent the presence of lower priority data in the internal buffer from blocking the immediate transmission of high-priority data. In this case, the separate access means for the real-time (priority) data provides a way to effectively bypass already buffered lower priority data.

When using both ADSL channels, the entire bandwidth available for payload data over the DSL must be statically partitioned between the low-delay channel and the high-reliability channel. From the point of view of the ATM layer device, these channels are independent circuits and proper management of traffic over the circuits requires that the ATM layer device provide a scheduling function connected to each channel. The only way to satisfy this requirement with "off the shelf" ATM layer devices and UTOPIA interfaces is to provide a separate UTOPIA port for each of the two channels. Thus, in the context of ADSL, each PHY layer device requires two separate UTOPIA bus addresses, one for the low-delay channel and one for the high-reliability channel.

FIG. 1 illustrates a known system for providing communication between an ATM layer device and multiple dual-channel PHY layer devices via a local interface, such as a UTOPIA bus. The ATM layer device supports a predefined number (N) of virtual channels. Each PHY layer device comprises two channel ports corresponding to two different types of channels. As shown in FIG. 1, each virtual channel communicates with one of the channel ports in one of the PHY layer devices via a separate address corresponding to the local interface. Thus, because each PHY layer device supports two types of channels, the ATM communication system that supports N virtual channels on the ATM layer device and N addresses on the local interface is restricted to (N/2) PHY layer devices.

The UTOPIA bus was originally conceived for use in ATM switching nodes within the network where the total number of ports connected to a switch is typically fairly small. Thus, as described above, the total number of PHY layer devices that can be connected to the standard UTOPIA bus is thirty-one (one invalid address). However, in systems such as those described above where more than one type of channel is supported by each PHY layer device, the total number of PHY layer devices that may be used with the UTOPIA address is substantially reduced. For instance, where two types of channels are employed, the UTOPIA bus can only support half as many, for instance, fifteen in the example above, dual-channel PHY layer devices.

The reduction in the number of PHY layer devices is very problematic. For example, in the DSL environment where many subscribers are served by a single ATM switching node, such as a DSLAM, it is advantageous to be able to connect a very large number of PHY layer devices to a single ATM layer device.

One known solution to this problem proposes including multiple ATM layer devices in the communication system. This approach, however, is also problematic. For instance, including multiple ATM layer devices significantly increases the complexity, cost, and power consumption of the communication system. Furthermore, where the communication system also includes a DSLAM, including multiple ATM layer devices also increases the complexity, cost, and power consumption of the ATM layer device in the DSLAM and may require modification to the DSLAM backplane. In addition, the inclusion of additional ATM layer devices may actually require so much space as to preclude achieving the desired ratio of PHY layer devices. Furthermore, other solutions all by necessity use a non-standard technique to expand the address space. This limits the choices for physical and ATM layer devices, and, in so doing, defeats the purpose of a standard interface, such as the UTOPIA bus, which is to expand the range of candidate devices for building ATM systems.

Thus, a heretofore unaddressed need exists in the industry to address the aforementioned deficiencies and inadequacies.

SUMMARY OF THE INVENTION

The present invention provides systems and methods for providing communication between an ATM layer device and multiple multi-channel PHY layer devices, which increase the number of multi-channel PHY layer ports supported by the ATM layer device.

Briefly described, in architecture, an embodiment of a system according to the present invention comprises an ATM layer device that supports a plurality of ATM communication channels in which each of the plurality of ATM communications channels correspond to a first class of service or a second class of service, a plurality of physical layer devices each having a first channel port associated with the first class of service and a second channel port associated with the second class of service, and a local interface having a plurality of addresses which are in communication with the ATM layer device and the plurality of physical layer devices for establishing a plurality of channel connections between each of the plurality of ATM communication channels and the first channel port and the second channel port in each of the plurality of physical layer devices. In the system, each of the plurality of channel connections associated with the plurality of second channel ports is via one of the plurality of addresses and at least two of the plurality of channel connections associated with the plurality of first channel ports is via no more than one of the plurality of addresses. The system may also be configured so that each of the plurality of ATM communication channels associated with one of the plurality of first channel ports is adapted to carry priority data traffic, such as, for example, real-time traffic, and each of the plurality of ATM communication channels associated with one of the plurality of second channel ports is adapted to carry non-priority data traffic, such as, for example, non-real-time traffic. The system may also include an ATM switch, such as a DSLAM, that provides the plurality of communication channels to the ATM layer device and which is adapted to provide services, such as, for example, DSL services, to a plurality of external PHY layer device.

Briefly described, in architecture, another embodiment of a system according to the present invention comprises an ATM layer device that supports a plurality of ATM communication channels each corresponding to a first class of service or a second class of service, a plurality of physical layer devices each having a first channel port associated with the first class of service and a second channel port associated with the second class of service, a first local interface in communication with the ATM layer device and each of the plurality of second channel ports for establishing a first plurality of channel connections via one of a portion of a plurality of addresses associated with the first local interface, an address expansion device in communication with the first local interface via the remaining portion of the plurality of addresses, and a second local interface in communication with the address expansion device and each of the plurality of first channel ports.

The present invention can also be viewed as providing methods for providing communication between an ATM layer device and multiple multi-channel PHY layer devices, which increase the number of multi-channel PHY layer ports supported by the ATM layer device.

Briefly, one such method involves (1) receiving a plurality of ATM communication channels, a portion of the plurality of ATM communication channels corresponding to a first service class and the remaining channels corresponding to a second service class, (2) providing a first plurality of channel connections between each of the portion of the plurality of ATM communication channels corresponding to the first service class and one of the plurality of first channel ports, wherein at least two of the first plurality of channel connections is via no more than one of the plurality of addresses, and (3) providing a second plurality of channel connections between the remaining channels corresponding to the second service class, wherein each of the second plurality of channel connections is via one of the plurality of addresses. As with the embodiments of the system according to the present invention, the plurality of ATM communication channels may be received from an ATM switch, such as a DSLAM, in which case the method further comprises providing services, such as DSL services, to an external physical layer device via one of the plurality of physical layer devices.

Another such method involves (1) receiving an ATM cell associated with one of a plurality of ATM communication channels, each of the plurality of ATM communication channels corresponding to either a first class of service or a second class of service, (2) determining a VPI/VCI value associated with the ATM cell, (3) based on the VPI/VCI value and a predefined set of rules, determine whether the ATM cell corresponds to the first class of service or the second class of service and determine which of the plurality of addresses on the local interface to which the VPI/NCI value is associated, and (4) where the ATM cell corresponds to the first class of service, providing the ATM cell to all of the first channel ports via a first unique address on the local interface and where the ATM cell corresponds to the second class of service, providing the ATM cell to one of the second channel ports via a second unique address.

A further method involves (1) receiving an ATM cell associated with one of a plurality of ATM communication channels, each of the plurality of ATM communication channels corresponding to either a first class of service or a second class of service, (2) determining a VPI/VCI value associated with the ATM cell, (3) based on the VPI/VCI value and a first predefined set of rules, determine whether the ATM cell corresponds to the first class of service or the second class of service and determine which of a plurality of addresses on a first local interface to which the VPI/VCI value is associated, and (4) where the ATM cell corresponds to the first class of service, providing the ATM cell to an address expansion device via a first unique address on the local interface and, based on the VPI/VCI value and a second predefined set of rules, providing the ATM cell to one of the plurality of first channel ports associated with the VPI/VCI value via one of a plurality of addresses on a second local interface and where the ATM cell corresponds to the second class of service, providing the ATM cell to one of the second channel ports via a second unique address on the first local interface.

The present invention can also be viewed as a computer-readable medium having logic for providing communication between an ATM layer device and multiple multi-channel PHY layer devices, which increases the number of multi-channel PHY layer ports supported by the ATM layer device. The computer-readable medium may include the steps of the methods of the present invention as an ordered listing of executable instructions for implementing logical functions related to providing communication between an ATM layer device and multiple multi-channel PHY layer devices. The list of executable instructions, which are embodied in the computer-readable medium, may be used by or in connection with an instruction execution system, apparatus, or device, such as a computer-based system, processor-containing system, or other system that can fetch the instructions from the instruction execution system, apparatus, or device and execute the instructions.

Other systems, methods, features, and advantages of the present invention will be or become apparent to one with skill in the art upon examination of the following drawings and detailed description. It is intended that all such additional systems, methods, features, and advantages included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENT

Having summarized the invention above, the invention will now be described in detail with reference to the drawings. While the invention will be described in connection with these drawings, there is no intent to limit it to the embodiment or embodiments disclosed. On the contrary, the intent is to cover all alternatives, modifications and equivalents included within the spirit and scope of the invention as defined by the appended claims.

Figure 1:
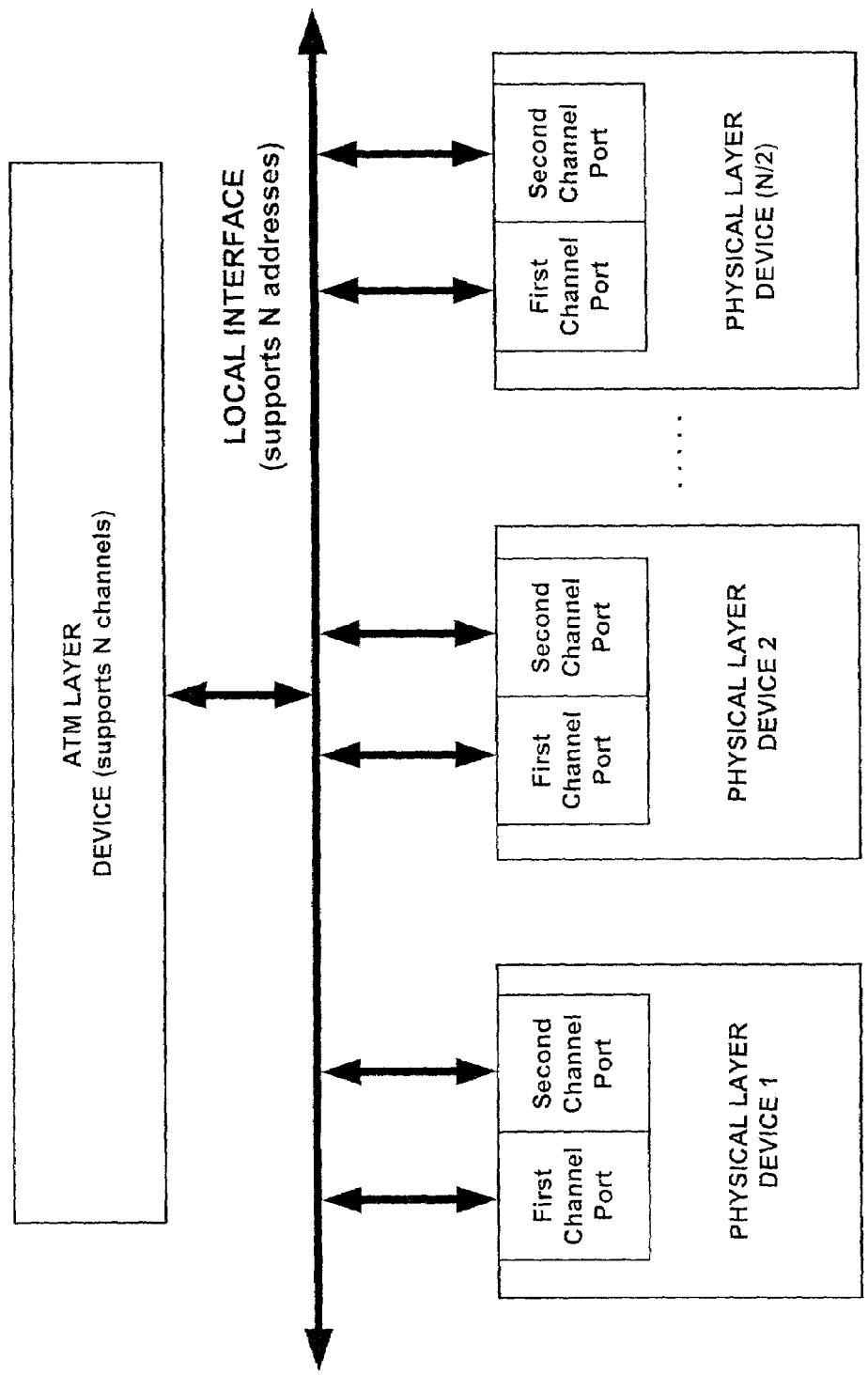
FIG. 1 is a block diagram illustrating a prior art system for providing communication between ATM layer device and multiple multi-channel PHY layer devices.
Figure 2:
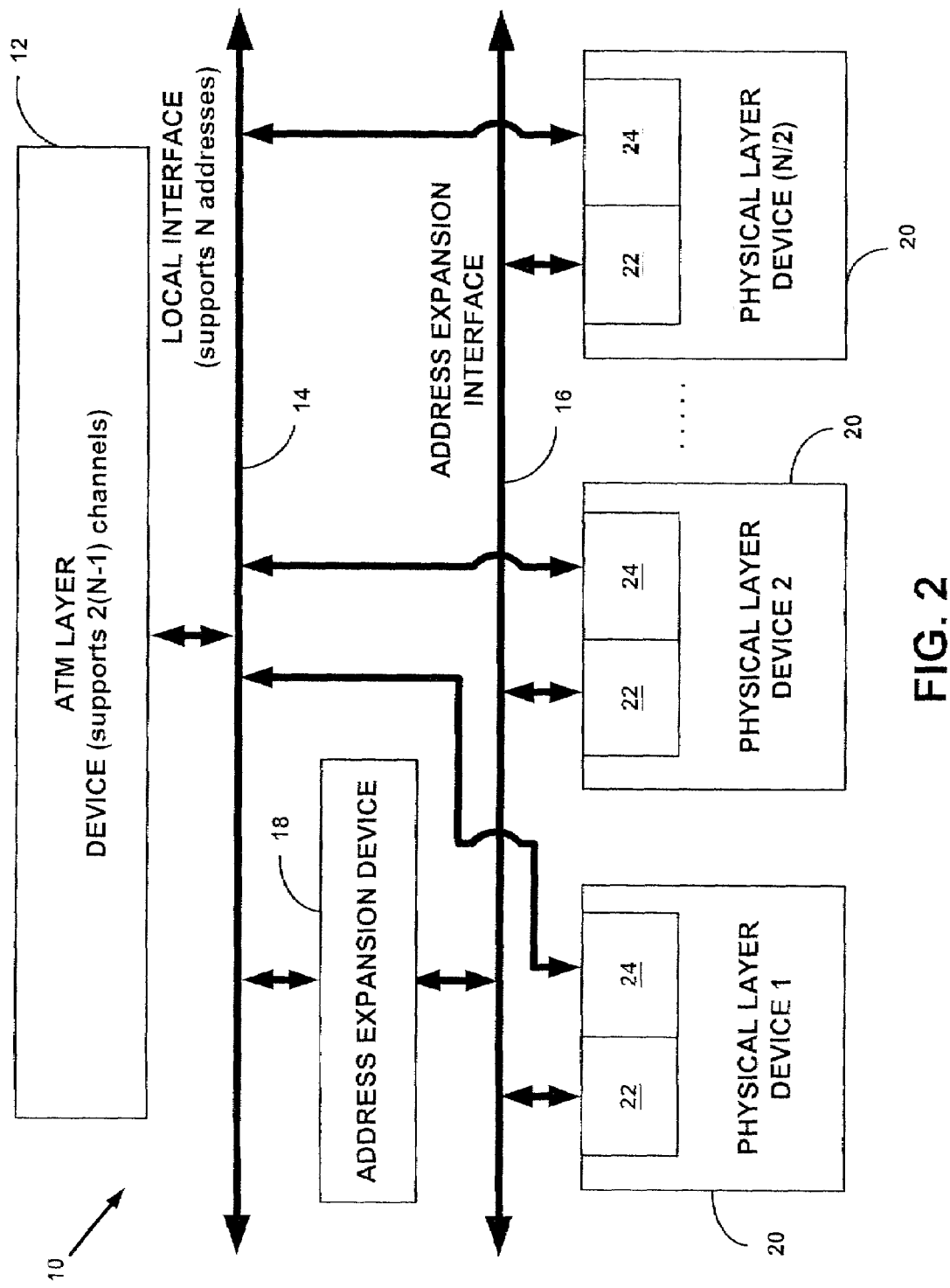
FIG. 2 is a block diagram illustrating an embodiment of a system for implementing the present invention.

FIG. 2 shows a block diagram of a communication system 10 according to one of a number of embodiments of the systems and methods of the present invention. System 10 includes an ATM layer device 12, a local interface 14, an address expansion interface 16, an address expansion device 18, and physical layer (PHY layer) devices 20. ATM layer device 12 and PHY layer devices 16 communicate via local interface 14 and address expansion interface 16. System 10 may be bi-directional in that ATM data cells may be transferred from ATM layer device 12 to PHY layer devices 20 (downstream) and from PHY layer devices 20 to ATM layer device 12 (upstream) simultaneously.

ATM layer device 12 may be any ATM switching device which is adapted to communicate with another ATM layer device via a plurality of ATM communication channels and route the communication channels to appropriate physical layer devices. ATM layer device 12 may be implemented in hardware, software, firmware, or a combination thereof. For example, ATM layer device 12 may be implemented in software or firmware that is stored in a memory and that is executed by a suitable instruction execution system. ATM layer device 12 may also be implemented in hardware with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

PHY layer device 20 may be a modem, such as, for example, a DSL modem, or any other PHY layer device. Each PHY layer device 20 comprises a first channel port 22 and a second channel port 24. However, one of ordinary skill in the art should understand that, PHY layer devices 20 may be configured with additional channel ports. Channel ports 22 and 24 may be adapted to communicate with, and provide data services to, any external PHY layer device. Specifically, first channel port 22 is adapted to communicate with an external PHY layer device via a first communication channel and second channel port 24 is adapted to communicate with an external PHY layer device via a second communication channel. As described in more detail below, first communication channels 22 are restrained to a first class of service and second communication channels 24 are restrained to a second class of service. First and second communication channels 22 and 24 are not necessarily separate transmission paths, but may be distinguished only as to the treatment, for example, the priority in internal buffering, that is afforded to cells arriving via a particular interface to PHY layer devices 20.

Local interface 14 communicates with ATM layer device 12, address expansion device 18, and each second channel port 24 in each PHY layer device 20 via a plurality of data addresses. The plurality of addresses on local interface 14 is allocated as follows. Each of the second channel ports 22 on each of the PHY layer devices 20 has an address on local interface 18, and ATM layer device 12 is in communication with each of these second channel ports 22 through its respective address. Address expansion device 18 has an address on local interface 18, and ATM layer device 12 is in communication with address expansion device 18 through this address. Thus, address expansion device 18 appears as another PHY layer device to ATM layer device 12.

Address expansion interface 16 communicates with address expansion device 18 and each first channel port 24 in each PHY layer device 20 via a plurality of data addresses. The plurality of addresses on address expansion interface 16 is allocated as follows. Each of the first channel ports 22 on each of the PHY layer devices 20 has an address on address expansion interface 18 and address expansion interface 16 is in communication with each of these first channel ports 24 through its respective address.

Local interface 14 and address expansion interface 16 may be any data path interface capable of providing communication between an ATM layer device and a plurality of PHY layer devices. In the preferred embodiment of system 10 local interface 14 and address expansion interface 16 conform to the UTOPIA level 2 specification described above.

Address expansion device 18 communicates with local interface 14 and address expansion interface 16. As will be described in more detail below, address expansion device 18 is adapted to provide the ATM cells associated with the ATM communication channels received from ATM layer device 12 to the appropriate first channel port 22 based on predefined logic by which address expansion device 18 is programmed. Address expansion device 18 may also be implemented in hardware, software, firmware, or a combination thereof. For example, address expansion device 18 may be implemented in software or firmware that is stored in a memory and that is executed by a suitable instruction execution system. Address expansion device 18 may also be implemented in hardware with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Referring again to FIG. 2, the operation of system 10 in the downstream direction will now be described. ATM layer device 12 receives a predefined number of ATM communication channels from an external ATM layer device, which may be an ATM switch, a DSLAM, or any other type of ATM layer device. System 10 is configured so that each of the ATM communication channels corresponds to either a first class of service or a second class of service. As will be described in more detail below, ATM communication channels corresponding to the first class of service is routed to one of the plurality of first channel ports 22 on each PHY layer device 20. Each of the ATM communication channels corresponding to the second class of service is routed to one of the plurality of second channel ports 24 on each PHY layer device 20. In accordance with the systems and methods of the present invention, where local interface 14 supports N addresses, system 10 enables an increased number of multi-channel PHY layer devices 20 to communicate with ATM layer device 12. For example, where multi-channel PHY layer devices 20 support two channels, system 10 enables (N−1) PHY layer devices 20 to communicate with ATM layer device 12 via local interface 14 via N addresses.

The two different classes of service define the service attributes and/or traffic attributes associated with the particular type of ATM communication channel. The two different classes of service may be chosen based on a variety of factors related to service categories and/or traffic attributes associated with communication system 10. For instance, the selection of classes of service may be based on any of the following standard ATM classes of service: constant bit rate (CBR), variable bite rate-non-real-time (VBR-NRT), variable bit rate-real-time (VBR-RT), available bit rate (ABR), and unspecified bit rate (UBR). The selection of classes of service may also be based on, for example, any of the following standard traffic parameters, quality of service parameters, and feedback characteristics: peak cell rate (PCR), sustained cell rate (SCR), maximum burst size (MBS), minimum cell rate (MCR), cell delay variation (CDV), maximum cell transmission delay (max-CTD), and cell loss ratio.

In certain embodiments of system 10, the first class of service corresponds to priority traffic, such as real-time traffic (conventionally CBR and VBR-RT) and the second class of service corresponds to non-priority traffic, such as non-real-time traffic. Thus, each ATM communication channel corresponding to the first class of service may be referred to as a priority channel and each ATM communication channel corresponding to the second class of service may be referred to as a non-priority channel.

Typically, a PHY layer device 20 controls the transfer of cells from an ATM layer device 12 to the PHY layer device 20 so that the number of cells transferred matches the transmission capacity of the PHY layer device 20. The availability of the PHY layer device 20 for the transfer of a cell from the ATM layer device 12 may be indicated by a binary-state signal, such as, for example, the "transmit cell available" or "TxClav" signal prescribed for the UTOPIA bus. This regulation of the flow of cells from the ATM layer device 12 to the PHY layer device 20 is sometimes termed "push-back," referring to the ability of the PHY layer device 20 to push back against the flow of cells from the ATM layer device 12 in order to throttle this flow to the required rate.

When the transmit data for multiple PHY layer devices 20 is transferred via a single UTOPIA interface, this "push-back" signal becomes meaningless because there is not a logical combination of the "transmit cell available" signals of the multiple PHY layer devices 20 that is valid. For example, if the "transmit cell available" signal presented to the ATM layer device 12 is formed as the logical "OR" of the same signals presented by the individual PHY layer devices 20, a cell could be transferred any time at least one of the PHY layer devices 20 was able to accept another cell. However, the ATM layer device 12 has no way of knowing specifically which PHY layer devices 20 are in this state. Therefore, there is no way to guarantee that the next cell transferred will go to a PHY layer device 20 that is actually in this state, as opposed to one that cannot currently accept a transmit cell. This results in buffer overflow in the PHY layer device 20 causing loss of a transmit cell. If, on the other hand, the "transmit cell available" signal presented to the ATM layer device 12 is formed as the logical "AND" of the same signals presented by the individual PHY layer devices 20, a cell cannot be transferred from the ATM layer device 12 unless all PHY layer devices 20 are able to accept another cell. As a result, if at least one PHY layer device 20 is operating at a transmit speed that is less than that of the other devices that receive cells via the same port, this device may prevent transfer of cells to the higher speed PHY layer devices 20, thereby preventing these devices from transmitting data at their currently supported rates.

As a result of the above limitation, it is impractical to use the "transmit cell available" signal for control of the flow of cells from the ATM layer device 12 to the multiple PHY layer devices 20 via a single port. It must be possible to transfer priority cells, such as real-time cells, from the ATM layer device 12 to any of the PHY layer devices 20 whenever such a cell is available. This seemingly impractical requirement can be made practical by taking advantage of the fact that the maximum rate of an ATM channel can be both specified via the "traffic contract" for the service provided by the virtual circuit and enforced via the "usage parameter control," better known as "policing" functions that are also specified for ATM data transmission. This maximum data transmission rate is referred to as the "peak cell rate" or PCR. If the sum of the PCRs for the virtual circuits carried on a given PHY layer device 20 is no greater than the total transmit data rate provided by the PHY layer device 20, there will never be a need for the PHY layer device 20 to "push-back" against the flow of cells for these circuits. In other words, there is no need for the "transmit cell available" signal in this case. It is acceptable for the single interface to the ATM layer device 12 to always present its "transmit cell available" in the asserted condition.

Therefore, traffic carried over priority channels must be limited to a certain bandwidth. For example, because CBR, VBR-RT and VBR-NRT service categories always specify PCR, channels corresponding to these service categories may be carried on the priority channel. Channels corresponding to ABR and UBR service categories may also be carried on priority channels provided their PCR can be limited.

If the only traffic carried over the line is transmitted as priority data, it is not possible to make use of all of the available transmission capacity of a given PHY layer device 20. For all traffic classes except CBR, the instantaneous data rate varies widely over time. Therefore, if the PCRs of the constituent priority circuits is no greater than the circuit capacity, the average amount of data carried can be expected to be much less than the circuit capacity. Efficient usage of the available bandwidth requires some "best effort" channels (e.g. with UBR traffic class) running via the non-priority interface. This allows use of the additional line capacity that is available whenever the instantaneous data rate of one or more priority circuits is less than its PCR. This can be expected to be the vast majority of the time if the traffic class of the circuit is other than CBR.

As discussed above, in addition to limiting the bandwidth of priority channels, the bandwidth available for priority channels must be greater than or equal to the sum of the maximum bandwidths (PCRs) of each priority channel. Furthermore, there must be enough buffering in the system to accommodate momentary bursts in effective bandwidth caused by nearly coincident dispatching of cells from multiple ATM communication channels due to the limited bus speed of local interface 14. When these requirements are satisfied, the priority channel operates in a "flow-through" manner. Furthermore, there is no "head of line" blocking and no need for "push-back" (flow control).

There are no specific requirements for the non-priority channel. Non-priority channels may carry channels corresponding to any combination of traffic classes. As with any physical layer device, taking advantage of the statistical nature of cell rate bursts on non-CBR channels allows some amount of bandwidth over-subscription. Typically the non-priority channel bandwidth would have to be greater than the sum of the sustainable bandwidths of each of the ATM communication channels with traffic categories that specify this value. The "push-back" from second channel ports 24 allows ATM layer device 12 to properly schedule cell dispatching based on the instantaneously available bandwidth. Of course, ideally bandwidth provided by a PHY device 20 that is not instantaneously needed by the priority channel can be immediately made available to the non-priority channel. In this case, the excess bandwidth could typically be applied to best effort UBR traffic. This capability is very important for efficient use of the available line bandwidth in that it allows recovery of the excess priority channel bandwidth that is otherwise lost. This excess bandwidth arises from the requirement to allocate priority bandwidth equal to the sum of the worst case (peak) requirements of the priority channels.

As known by those of ordinary skill in the art, while separate access for priority data, such as real-time data, between the ATM layer device 12 and the PHY layer device 20 for the downstream direction may be provided, the same is not true for the upstream direction. The reason is that, at this point, the special treatment required in the data transmission process has already been afforded the priority data. Maintaining this segregation into separate paths for the transfer into the ATM layer device 12 is not necessary. The interface between the PHY layer device 20 and the ATM layer device 12 in the upstream direction does not impose a restriction on the flow of data. The ATM layer device 12, by its basic functional definition, provides the appropriate treatment based on priority and other flow characteristics for example, latency that are required for further transmission of this upstream data within the ATM network. However, in other embodiments, separate access for priority data may be provided in the upstream direction.

As stated above, ATM layer device 12 receives a predefined number of ATM communication channels from an external ATM layer device. Each of the ATM communication channels corresponds to either a first class of service (for example, a priority channel) or a second class of service (for example, a non-priority channel). Traffic carried over each of the communication channels is carried as discrete ATM cells. As an ATM cell corresponding to one of the ATM communication channels is received from the external device, ATM layer device 12 routes the ATM cell based on functionality by which it is programmed.

Figure 3:
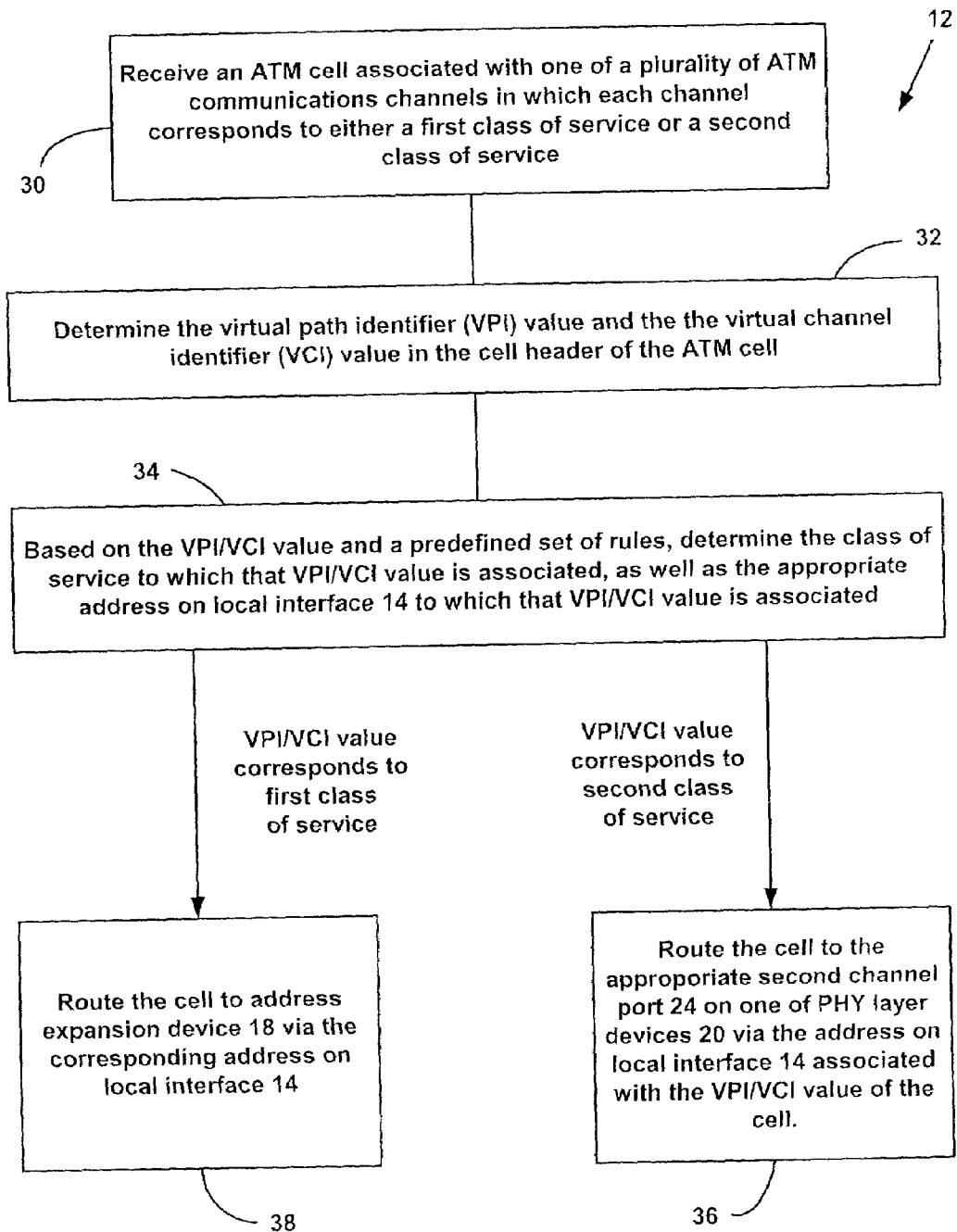
FIG. 3 is a flow chart illustrating the architecture, functionality, and operation of an embodiment of the ATM layer device in the system of FIG. 2 according to the present invention.

FIG. 3 shows the architecture, functionality, and operation of ATM layer device 12. In this regard, each block represents a module, segment, or portion of code or logic, which comprises one or more executable instructions for implementing the specified logical function(s). It should also be noted that in some alternative implementations, the functions noted in the blocks may occur out of the order noted in FIG. 3. For example, two blocks shown in succession may in fact be executed substantially concurrently or the blocks may sometimes be executed in the reverse order, depending upon the functionality involved.

At block 30, ATM layer device 12 receives an ATM cell associated with one of the ATM communication channels. At block 32, ATM layer device 12 determines the VPI value and the VCI value in the cell header of the ATM cell. Based on the VPI/VCI values and a predefined set of rules, at block 34, ATM layer device 12 determines the class of service to which that VPI/VCI value is associated, as well as the appropriate address on local interface 14 to which that VPI/VCI value is associated. If the ATM cell is associated with the second class of service, at block 36, ATM layer device 12 routes the cell to second channel port 24 on one of PHY layer devices 20 via the address on local interface 14 associated with the VPI/VCI value of the cell. If the ATM cell is associated with the first class of service, at block 38, ATM layer device 12 routes the cell to address expansion device 18 via the corresponding address on local interface 14.

Thus, ATM layer device 12 routes all cells for each of the ATM communication channels associated with the second class of service to a unique address on local interface 14 corresponding to the second channel port 24 on one of PHY layer devices 20. ATM layer device 12 routes each of the ATM communication channels associated with the first class of service to the address on local interface 14 corresponding to address expansion device 18.

As described above, the communication channel for each first channel port is effectively a flow through channel with no pushback because of the bandwidth limitation. Thus, the aggregation of the communication channels for all first channel ports 22 as seen by address expansion device 18 is also effectively flow through. Because ATM layer device 12 routes cells on a per communication channel, or per VCC, basis, the fact that multiple PHY layer devices 20 are routed to a single address on local interface 14 is not a problem.

According to a preferred embodiment of system 10, the VPI/VCI values assigned to cells associated with the first class of service by ATM layer device 12 should be such that these values can be used by address expansion device 18 to uniquely determine which address on address expansion interface 16 to use when routing the cells to the corresponding PHY layer device 20. For example, some of the bits in the VPI field may be mapped to the address on address expansion interface 16 to use for this cell. Thus, when cells are transferred from local interface 14 to address expansion bus 16, address expansion device 18 may alter the VPI/VCI value to a value needed for transmission to an external PHY layer device, such as where system 10 provides DSL services. For example, there may be a communication channel with a VPI/VCI value equal to 0/39 on every DSL line connected to PHY layer devices 20, but the cells are received at ATM layer device 12 with a VPI/VCI value equal to (P)/39, where (P) is uniquely mapped to an address on expansion interface 16. In essence, address expansion device 18 provides a direct substitution of one value for another. Similarly, for communication in the upstream direction from PHY layer devices 20 to ATM layer device 12, address expansion device 18 must provide an inverse substitution for cells. In this case, the address on expansion interface 16 from which the receive cell was obtained is used to alter the VPI/VCI values. In the same manner, each communication channel associated with a first channel port 22 must be delivered to ATM layer device 12 with unique VPI/VCI values even though they may carry non-unique values over the DSL lines.

In short, address expansion device 18 routes downstream cells to the appropriate PHY layer device 20 via address expansion interface 16. It also combines cells received by PHY layer devices 20 into a single upstream cell stream that is then delivered to ATM layer device 12 via local interface 14. ATM layer device 12 does not exert any flow control on cell transfers in this direction because they are assumed to be coming from a PHY layer device 20 that has no means to stop their flow at the receiving end of the circuit.

Figure 4:
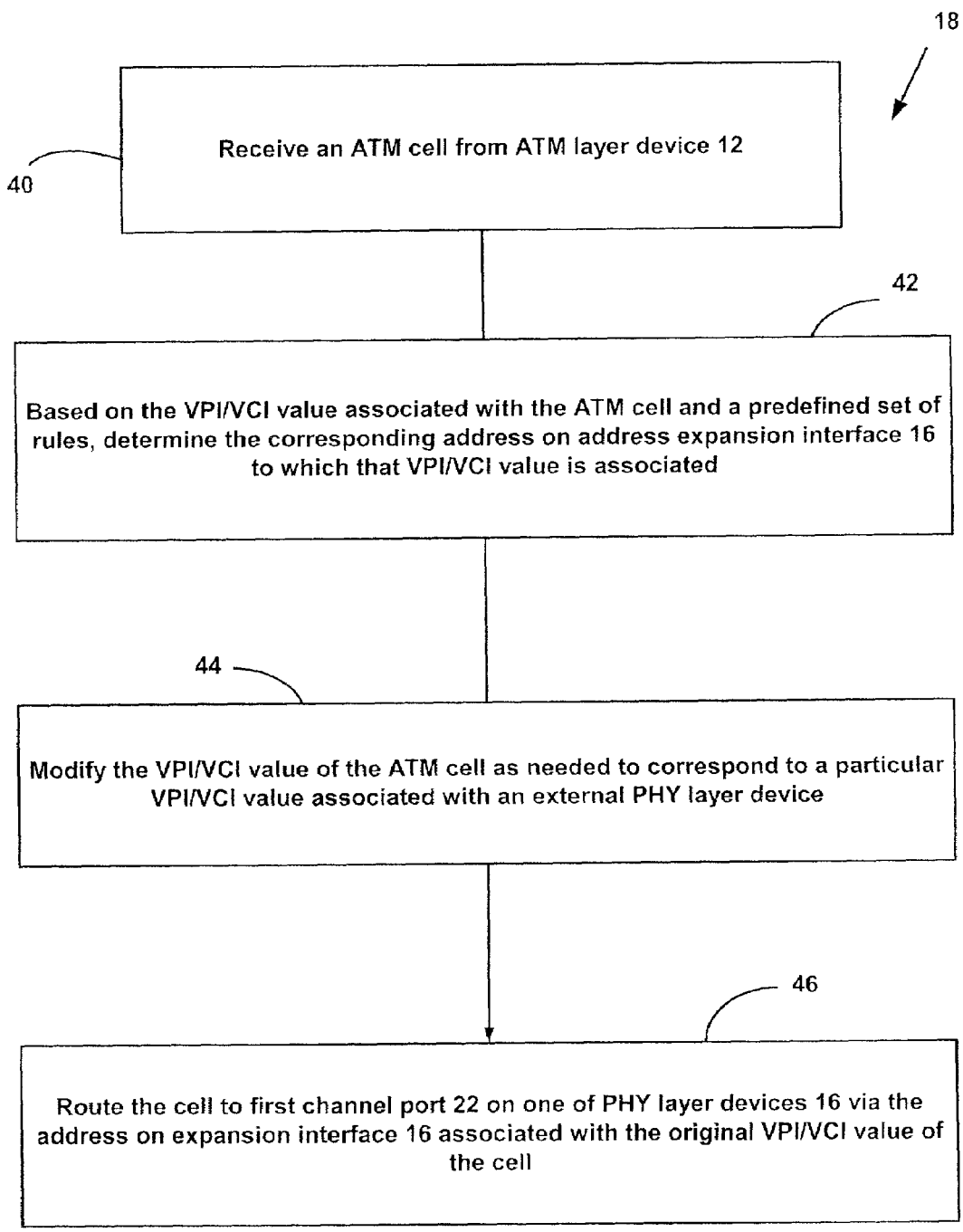
FIG. 4 is a flow chart illustrating the architecture, functionality, and operation of an embodiment of the address expansion device in the system of FIG. 2 according to the present invention.

FIG. 4 shows the general architecture, functionality, and operation of address expansion device 18. In this regard, each block represents a module, segment, or portion of code or logic, which comprises one or more executable instructions for implementing the specified logical function(s). It should also be noted that in some alternative implementations, the functions noted in the blocks may occur out of the order noted in FIG. 4. For example, two blocks shown in succession may in fact be executed substantially concurrently or the blocks may sometimes be executed in the reverse order, depending upon the functionality involved.

At block 40, address expansion device 18 receives a cell from ATM layer device 12. As described above, each cell received by address expansion device 18 corresponds to the first class of service. Based on the VPI/NCI values and a predefined set of rules, at block 42, address expansion device 18 determines the corresponding address on address expansion interface 16 to which that VPI/VCI value is associated. At block 44, address expansion device 18 may modify the VPI/VCI value (as described above) to correspond to a predefined VPI/VCI value associated with an external PHY layer device. Address expansion device 18 may perform such VPI/VCI translation for subsequent transmission of the cell to an external PHY layer device, such as, for example, where system 10 provides DSL services. At block 46, address expansion device 18 routes the cell to first channel port 22 on one of PHY layer devices 20 via the address on expansion interface 16 associated with the original VPI/VCI value of the cell.

Figure 5:
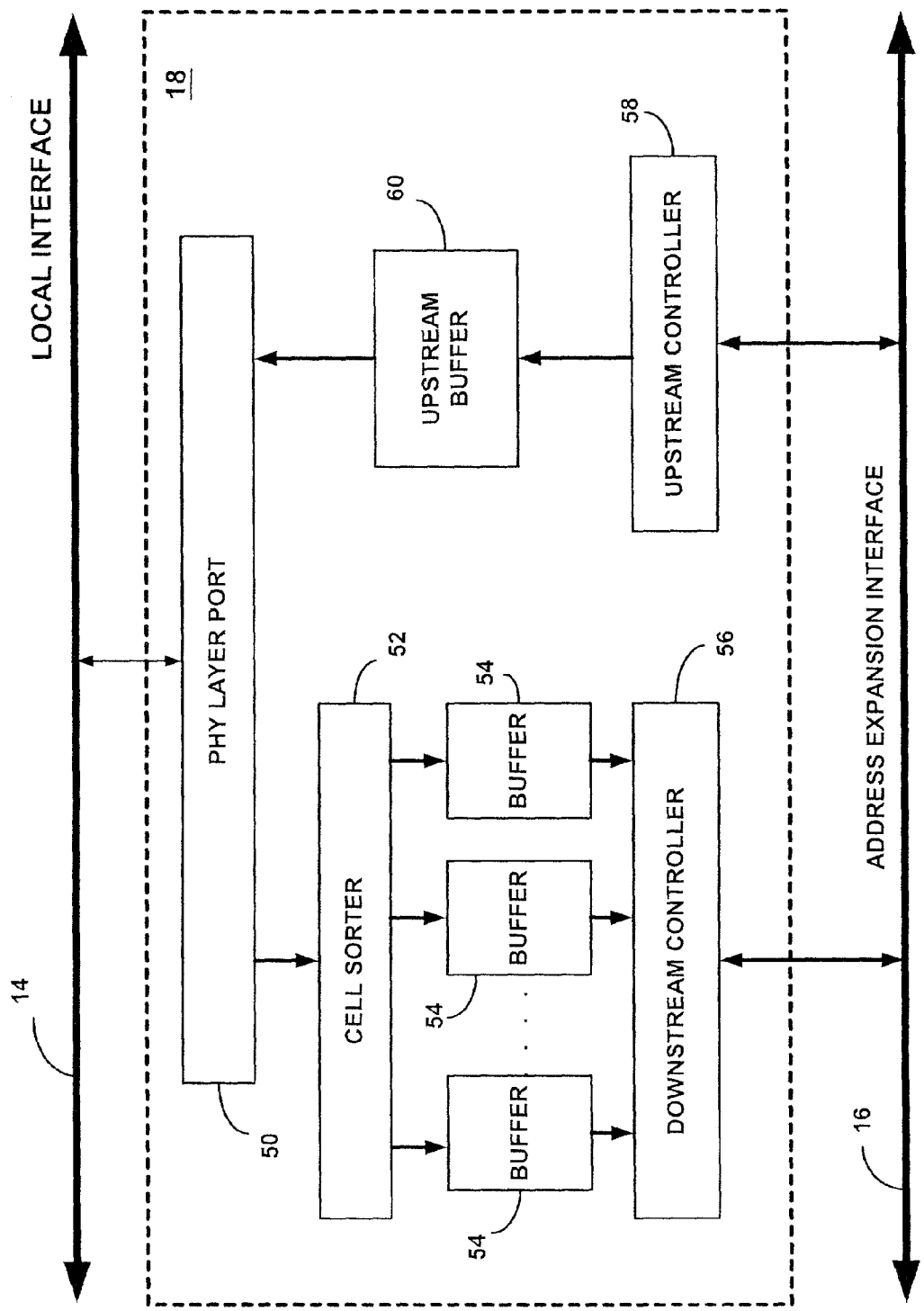
FIG. 5 is a block diagram illustrating another embodiment of the address expansion device in the system of FIG. 2 according to the present invention.

FIG. 5 illustrates a preferred embodiment of address expansion device 18 implemented using hardware. Address expansion device 18 comprises a PHY layer port 50, a cell sorter 52, downstream buffers 54, downstream controller 56, upstream controller 58, and upstream buffer 60. PHY layer port 50 is coupled to local interface 14, cell sorter 52, and upstream buffer 60. Cell sorter 52 is also coupled to downstream buffers 54. Controller 56 is coupled to buffers 54 and address expansion interface 16. Controller 58 is coupled to address expansion interface 16 and buffer 60.

In operation, PHY port 50 receives the ATM cells from ATM layer device 12 via local interface 14. After receiving the ATM cell, cell sorter 52 determines the VPI/VCI value associated with the cell and, based on the VPI/VCI value and a predefined set of rules, determines the corresponding address on interface 16 to which that VPI/VCI value is associated. Cell sorter 52 may also perform the VPI/VCI translation described above prior to delivering the cell to the appropriate buffer 54 for the corresponding address on interface 16. In this implementation, buffering is required to accommodate momentary bursts in effective bandwidth caused by nearly coincident dispatching by ATM layer device 12. Buffers 54 hold the cell until controller 56 determines that the cell is ready to be routed to the appropriate first channel port 22. In the upstream direction, controller 58 receives cells from PHY layer devices 20 and delivers them to buffer 60. Again, a small amount of buffering is needed to hold a cell from the time address expansion device 18 receives it from PHY layer device 20 until the cell is provided to ATM layer device 12. Buffer 60 may also be modified with additional logic to perform the inverse VPI/VCI translation described above.

In alternative embodiments of communication system 10, the relative complexity of address expansion device 18 and PHY layer devices 20 may vary. For example, in one alternative embodiment, address expansion device 18 is substantially simplified by removing the logic related to controlling the transmission of cells in the upstream direction and PHY layer devices 20 are modified such that first channel ports 22 operate only in the downstream direction. This reduces the overall complexity of address expansion device 18 and first channel ports 22 by replacing a full duplex interface with a simple unidirectional interface and removing all logic associated with the upstream direction in address expansion device 18. As a result of simplifying the logic by which address expansion device 18 is programmed, PHY layer devices 20 are also adapted to perform the buffering functionality described above with respect to FIG. 5.

In alternative embodiments of communication system 10, the ATM layer device 12 is also configured differently as a result of the simplifications to address expansion device 18 and PHY layer devices 20. Typical standard ATM layer devices are fully capable of operating according to this new configuration. For example, with respect to the VPI/VCI translation functionality described above, ATM layer device 12 handles downstream cells differently than upstream cells. In the downstream direction, cells associated with the first class of service have unique VPI/VCI values and are all assigned to a unique address on address expansion interface 16. However, in the upstream direction, cells associated with the first class of service, are provided to ATM layer device 12 via a unique address on local interface 14 associated with each PHY layer device 20. The VPI/VCI translations that ATM layer device 12 performs for upstream cells is not the inverse of those performed for downstream cells. For example, downstream cells for PHY layer device 20 (PHY 10) that traverse the DSL with a VPI/VCI equal to 0/40 may be sent to address expansion device 18 (PHY 26) with VPI/VCI equal to 10/40, while they are received at ATM layer device 12 via PHY layer device 20 (PHY 10) via interface 24 with a VPI/VCI value equal to 0/40. As far as ATM layer device 12 is concerned, upstream and downstream cells are carried over two independent VCCs, and the fact that they are on the same duplex VCC on the DSL is irrelevant. There is no direct interaction between the downstream and upstream directions of a VCC at this point in the network.

In another alternative embodiment of communication system 10, address expansion device 18 simply broadcasts all cells associated with the first class of service from ATM layer device 12 to all first channel ports 22. Again, PHY layer devices 20 may be adapted to communicate with address expansion device 18 via a simplex serial interface. The logic described above related to using the VPI/VCI values of these cells to select a particular first channel port 22 is replaced by logic in PHY layer devices 20 that drops all downstream cells associated with the first class of service except those containing VPI/VCI values assigned to this line. PHY layer devices 20 may also be adapted to perform the VPI/VCI translation and buffer functionality described above.

Figure 6:
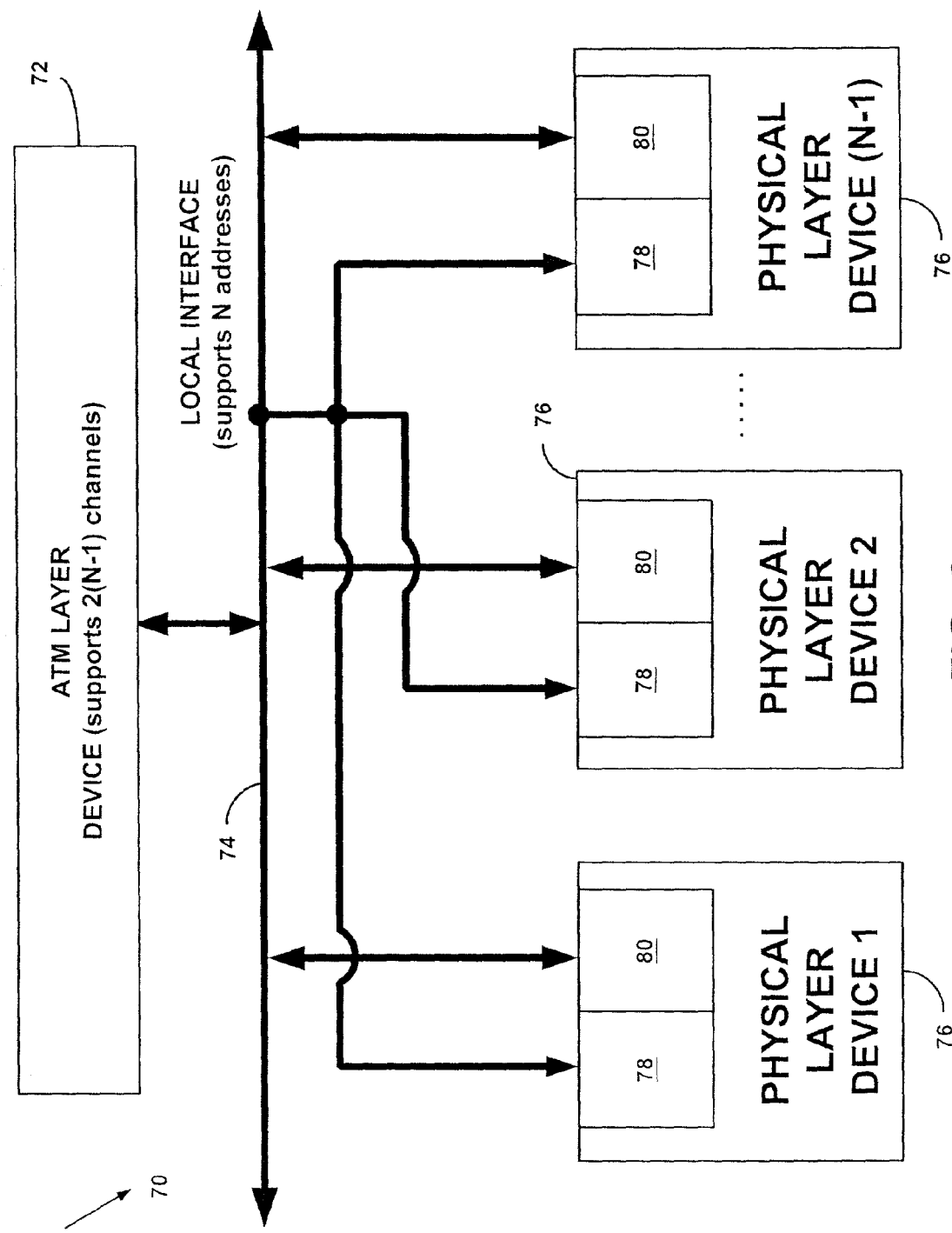
FIG. 6 is a block diagram illustrating another embodiment of a system for implementing the present invention.

FIG. 6 shows a block diagram of a bi-directional communication system 70 according to alternative embodiments of the systems and methods of the present invention. System 70 includes an ATM layer device 72, a local interface 74, and PHY layer devices 76. ATM layer device 72 and PHY layer devices 76 communicate via local interface 74.

ATM layer device 72 may be any ATM switching device which is adapted to communicate with another ATM layer device via a plurality of ATM communication channels and route the communication channels to appropriate physical layer devices. ATM layer device 72 may be implemented in hardware, software, firmware, or a combination thereof. For example, ATM layer device 72 may be implemented in software or firmware that is stored in a memory and that is executed by a suitable instruction execution system. ATM layer device 72 may also be implemented in hardware with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. The interface between the ATM layer device 72 and the PHY layer devices 76 may be a standard interface containing no non-standard provisions in order to expand the available number of addressable PHY layer devices 76.

PHY layer devices 76 may be a modem, such as, for example, a DSL modem, or any other PHY layer device. Each PHY layer device 76 comprises a first channel port 78 and a second channel port 80, but may be configured with additional channel ports. Specifically, first channel port 78 is adapted to communicate with an external ATM layer device via a first communication channel and second channel port 80 is adapted to communicate with an external ATM layer device via a second communication channel.

Local interface 74 communicates with ATM layer device 72 and PHY layer devices 76. Local interface 74 may be any data path interface capable of providing communication between an ATM layer device and a plurality of PHY layer devices. In the preferred embodiment of system 70, local interface 74 conforms to the UTOPIA level 2 specification described above.

As with system 10, system 70 is configured so that each of the ATM communication channels corresponds to either a first class of service or a second class of service. ATM layer device 72 receives a predefined number of ATM communication channels from an external ATM layer device. Each of the ATM communication channels corresponds to either a first class of service or a second class of service. As in system 10, where local interface 74 supports N addresses, system 70 enables an increased number of multi-channel PHY layer devices 76 to communicate with ATM layer device 72. For example, where PHY layer devices 76 support two channels, system 70 enables (N−1) PHY layer devices 76 to communicate with ATM layer device 72.

Figure 7:
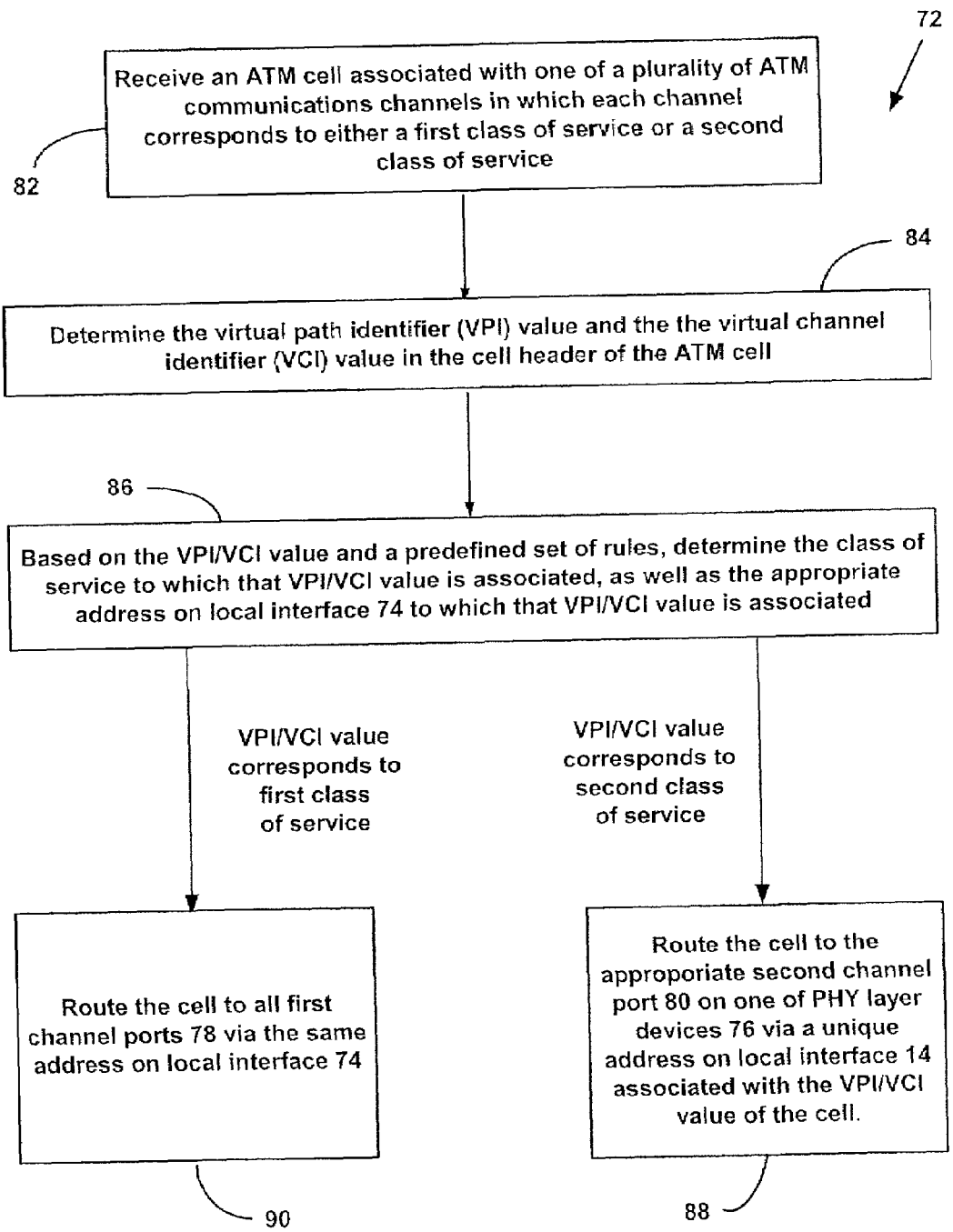
FIG. 7 is a flow chart illustrating the architecture, functionality, and operation of an embodiment of the ATM layer device in the system of FIG. 6.

FIG. 7 shows the architecture, functionality, and operation of ATM layer device 72. In this regard, each block represents a module, segment, or portion of code or logic, which comprises one or more executable instructions for implementing the specified logical function(s). It should also be noted that in some alternative implementations, the functions noted in the blocks may occur out of the order noted in FIG. 7. For example, two blocks shown in succession may in fact be executed substantially concurrently or the blocks may sometimes be executed in the reverse order, depending upon the functionality involved.

At block 82, ATM layer device 72 receives an ATM cell associated with one of the ATM communication channels. At block 84, ATM layer device 72 determines the VPI value and the VCI value in the cell header of the ATM cell. Based on the VPI/VCI value and a predefined set of rules, at block 86, ATM layer device 72 determines the class of service to which that VPI/VCI value is associated, as well as the appropriate address on local interface 74 to which that VPI/VCI value is associated. If the ATM cell is associated with the second class of service, at block 88, ATM layer device 72 routes the cell to second channel port 80 on one of PHY layer devices 76 via the unique address on local interface 74 associated with the VPI/VCI value of the cell. If the ATM cell is associated with the first class of service, at block 90, ATM layer device 72 routes the cell to all first channel ports 78 via the same address on local interface 74. Thus, ATM layer device 72 requires only a single address for the transmit direction for all PHY layer devices 76. When ATM layer device 72 transfers a downstream cell to this address, it is received by all first channel ports 78. This "broadcast" capability is inherent in all true "bus" arrangements such as the UTOPIA bus since, by definition, all participating devices connect to the same set of signals.

Each first channel port 78 may be a partial implementation of a standard UTOPIA interface in which cells are only transmitted in the downstream direction. System 70 may also be implemented using PHY layer devices 76 having a standard UTOPIA interface for first channel ports 78. In either situation, PHY layer device 76 is adapted to perform the cell filtering, VPC/VCI translation, and buffering functions described above. PHY layer device 76 is also adapted to send all upstream cells, both non-priority and priority cells, to the ATM layer device 72 via non-priority interface 80.

The functionality by which ATM layer device 12, ATM layer 72, and address expansion device 18 are programmed, comprises an ordered listing of executable instructions for implementing logical functions. As stated above, this functionality may be implemented in software, firmware, hardware, or a combination thereof. Thus, the functionality can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the functionality for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A communication system, comprising:
   an asynchronous transfer mode (ATM) layer device that supports a plurality of ATM communication channels, each of the plurality of ATM communications channels corresponding to a first class of service or a second class of service;
   a plurality of physical layer devices, each of the plurality of physical layer devices having a first channel port associated with the first class of service and a second channel port associated with the second class of service; and
   a local interface in communication with the ATM layer device and the plurality of physical layer devices and having a plurality of addresses,
   for establishing a plurality of channel connections between each of the plurality of ATM communication channels and the first channel port and the second channel port in each of the plurality of physical layer devices, the local interface having a plurality of addresses;
   wherein each of the plurality of channel connections associated with the plurality of second channel ports is via one of the plurality of addresses and at least two of the plurality of channel connections associated with the plurality of first channel ports is via no more than one of the plurality of addresses.

2. The system of claim 1, wherein each of the plurality of ATM communication channels associated with one of the plurality of first channel ports is adapted to carry priority data traffic and each of the plurality of ATM communication channels associated with one of the plurality of second channel ports is adapted to carry non-priority data traffic.

3. The system of claim 2, wherein the priority data traffic is real-time traffic and the non-priority data traffic is non-real-time traffic.

4. The system of claim 2, wherein the priority data traffic corresponds to any of the following group of ATM service categories: constant bit rate (CBR), real-time variable bit rate (rt-VBR), non-real-time variable bit rate (nrt-VBR), available bit rate (ABR), unspecified bit rate (UBR), and combinations thereof.

5. The system of claim 1, wherein the local interface conforms to Universal Test and Operations Physical Interface (UTOPIA) level 2 specification.

6. The system of claim 1, wherein each of the plurality of physical layer devices is adapted to communicate via a first communication channel and a second communication channel with an external physical layer device.

7. The system of claim 6, further comprising an ATM switch that provides the plurality of communication channels to the ATM layer device.

8. The system of claim 7, wherein the ATM switch is implemented in a digital subscriber line access multiplexer (DSLAM).

9. A communication system, comprising:
   an ATM layer means for receiving a plurality of ATM communication channels, each of the plurality of ATM communication channels corresponding to a first class of service or a second class of service;
   a plurality of physical layer means, each for communicating with an external physical layer device via a first port associated with the first class of service and a second port associated with the second class of service; and
   a communication means for interfacing the ATM layer means and the plurality of physical layer means and for establishing a plurality of channel connections between each of the plurality of ATM communication channels and the first and second ports associated with each of the plurality of physical layer means, the communication means having a plurality of addresses;
   wherein each of the plurality of channel connections associated with each of the plurality of second ports is via one of the plurality of addresses and at least two of the plurality of channel connections associated with the plurality of first ports is via no more than one of the plurality of addresses.

10. The system of claim 9, wherein each of the plurality of physical layer means is adapted to carry priority data traffic via the first communication channel and non-priority traffic via the second communication channel.

11. The system of claim 10, wherein the priority data traffic is real-time traffic and the non-priority data traffic is non-real-time traffic.

12. The system of claim 10, wherein the priority data traffic corresponds to any of the following group of ATM service categories: constant bit rate (CBR), real-time variable bit rate (rt-VBR), non-real-time variable bit rate (nrt-VBR), available bit rate (ABR), unspecified bit rate (UBR), and combinations thereof.

13. The system of claim 9, further comprising an ATM switch that provides the plurality of communication channels to the ATM layer device.

14. The system of claim 13, wherein the ATM switch is implemented in a digital subscriber line access multiplexer (DSLAM).

15. The system of claim 14, wherein each of the plurality of physical layer devices provides digital subscriber loop services to the corresponding external physical layer devices.

16. A method for providing communication between an ATM layer device and a plurality of physical layer devices via a local interface having a plurality of addresses, each of the plurality of physical layer devices having a first channel port and a second channel port, comprising:

receiving an ATM cell associated with one of a plurality of ATM communication channels, each of the plurality of ATM communication channels corresponding to either a first class of service or a second class of service;

determining a VPI/VCI value associated with the ATM cell;

based on the VPI/VCI value and a predefined set of rules, determine whether the ATM cell corresponds to the first class of service or the second class of service and determine which of the plurality of addresses on the local interface to which the VPI/VCI value is associated; and where the ATM cell corresponds to the first class of service, providing the ATM cell to all of the first channel ports via a first unique address on the local interface and where the ATM cell corresponds to the second class of service, providing the ATM cell to one of the second channel ports via a second unique address.

17. The method of claim 16, wherein the first class of service corresponds to priority data traffic and the second class of service corresponds to non-priority traffic.

18. The method of claim 17, wherein the priority data traffic is real-time traffic and the non-priority data traffic is non-real-time traffic.

19. The method of claim 18, wherein the priority data traffic corresponds to any of the following group of ATM service categories: constant bit rate (CBR), real-time variable bit rate (rt-VBR), non-real-time variable bit rate (nrt-VBR), available bit rate (ABR), unspecified bit rate (UBR), and combination thereof.

20. The method of claim 16, wherein the plurality of ATM communication channels is received from an ATM switch.

21. The method of claim 20; wherein the ATM switch is implemented in a DSLAM.

22. The method of claim 21, further comprising providing DSL services to an external physical layer device via one of the plurality of physical layer devices.

23. A method for providing communication between an ATM layer device and a plurality of physical layer devices, each of the plurality of physical layer devices having a first channel port and a second channel port, comprising:

receiving an ATM cell associated with one of a plurality of ATM communication channels, each of the plurality of ATM communication channels corresponding to either a first class of service or a second class of service;

determining a VPI/VCI value associated with the ATM cell;

based on the VPI/VCI value and a first predefined set of rules, determine whether the ATM cell corresponds to the first class of service or the second class of service and determine which of a plurality of addresses on a first local interface to which the VPI/VCI value is associated; and where the ATM cell corresponds to the first class of service, providing the ATM cell to an address expansion device via a first unique address on the local interface and, based on the VPI/VCI value and a second predefined set of rules, providing the ATM cell to one of the plurality of first channel ports associated with the VPI/VCI value via one of a plurality of addresses on a second local interface connected to the address expansion device and where the ATM cell corresponds to the second class of service, providing the ATM cell to one of the second channel ports via a second unique address on the first local interface.

24. The method of claim 23, wherein the first class of service corresponds to priority data traffic and the second class of service corresponds to non-priority traffic.

25. The method of claim 24, wherein the priority data traffic is real-time traffic and the non-priority data traffic is non-real-time traffic.

26. The method of claim 25, wherein the priority data traffic corresponds to any of the following group of ATM service categories: constant bit rate (CBR), real-time variable bit rate (rt-VBR), non-real-time variable bit rate (nrt-VBR), available bit rate (ABR), unspecified bit rate (UBR), and combinations thereof.

27. The method of claim 23, wherein the plurality of ATM communication channels is received from an ATM switch.

28. The method of claim 27, wherein the ATM switch is implemented in a DSLAM.

29. The method of claim 28, further comprising providing DSL services to an external physical layer device via one of the plurality of physical layer devices.

30. A computer-readable medium for providing communication between an ATM layer device and a plurality of physical layer devices, each of the plurality of physical layer devices having a first channel port and a second channel port, comprising:

a first portion of logic for receiving an ATM cell associated with one of a plurality of ATM communication channels, each of the plurality of ATM communication channels corresponding to either a first class of service or a second class of service;

a second portion of logic for determining a VPI/VCI value associated with the ATM cell;

a third portion of logic for determining, based on the VPI/VCI value and a first predefined set of rules, whether the ATM cell corresponds to the first class of service or the second class of service and determine which of a plurality of addresses on a first local interface to which the VPI/VCI value is associated; and a fourth portion of logic for (i) providing the ATM cell to an address expansion device via a first unique address on the local interface and for providing, based on the VPI/VCI value and a second predefined set of rules, the ATM cell to one of the plurality of first channel ports associated with the VPI/VCI value via one of a plurality of addresses on a second local interface where the ATM cell corresponds to the first class of service and (ii) providing the ATM cell to one of the second channel ports via a second unique address on the first local interface where the ATM cell corresponds to the second class of service.

31. The computer-readable medium of claim 30, wherein the first class of service corresponds to priority data traffic and the second class of service corresponds to non-priority traffic.

32. The computer-readable medium of claim 31, wherein the priority data traffic is real-time traffic and the non-priority data traffic is non-real-time traffic.

33. The computer-readable medium of claim 32, wherein the priority data traffic corresponds to any of the following group of ATM service categories: constant bit rate (CBR), real-time variable bit rate (rt-VBR), non-real-time variable bit rate (nrt-VBR), available bit rate (ABR), unspecified bit rate (UBR), and combination thereof.

34. The computer-readable medium of claim 30, wherein the plurality of ATM communication channels is received from an ATM switch.

35. The computer-readable medium of claim 34, wherein the ATM switch is implemented in a DSLAM.

36. The computer-readable medium of claim 35, further comprising a fifth portion of logic for providing DSL services to an external physical layer device via one of the plurality of physical layer devices.

37. A communication system, comprising:
an asynchronous transfer mode (ATM) layer device that supports a plurality of ATM communication channels, each of the plurality of ATM communications channels corresponding to a first class of service or a second class of service;
a plurality of physical layer devices, each of the plurality of physical layer devices having a first channel port associated with the first class of service and a second channel port associated with the second class of service; and
a local interface in communication with the ATM layer device and the plurality of physical layer devices, the local interface establishing a plurality of first class connections, each first class connection being between one of the ATM communications channels and one of the first channel ports, all of the first class connections using a single address on the local interface, the local interface establishing a plurality of second class connections, each second class connection being between one of the ATM communications channels and one of the second channel ports, each of the second class connections having a unique address on the local interface.

38. The system of claim 37, wherein each first channel connection is adapted to carry priority data traffic and each second channel connection is adapted to carry non-priority data traffic.

39. The system of claim 38, wherein the priority data traffic is real-time traffic and the non-priority data traffic is non-real-time traffic.

40. The system of claim 38, wherein the priority data traffic corresponds to any of the following group of ATM service categories: constant bit rate (CBR), real-time variable bit rate (rt-VBR), non-real-time variable bit rate (nrt-VBR), available bit rate (ABR), unspecified bit rate (UBR), and combinations thereof.

41. The system of claim 37, wherein the local interface conforms to Universal Test and Operations Physical Interface (UTOPIA) level 2 specification.

42. The system of claim 37, wherein each of the plurality of physical layer devices is adapted to communicate via a first physical layer channel and a second physical layer channel with an external physical layer device.

43. The system of claim 42, further comprising an ATM switch that provides the plurality of first channel connections and the plurality of second channel connections to the ATM layer device.

44. The system of claim 43, wherein the ATM switch is implemented in a digital subscriber line access multiplexer (DSLAM).

45. A communication system, comprising:
a local interface;
an address expansion device having an address on the local interface;
a plurality of physical layer (PHY) devices, each of the plurality of physical layer devices having a first channel port associated with a first class of service and a second channel port associated with a second class of service, each of the second channel ports having an address on the local interface;
an asynchronous transfer mode (ATM) layer device that supports a first plurality of ATM communication channels corresponding to the first class of service and a second plurality of ATM communication channels corresponding to the second class of service, the ATM layer device being in communication with each of the second channel ports through each second channel port's respective address on the local interface, the ATM layer device being in communication with the address expansion device through the address expansion device's address on the local interface; and
an expansion interface, each of the first channel ports having an address on the expansion interface, the expansion device being in communication with each of the first channel ports through each first channel port's respective address on the expansion interface,
the local interface and expansion interface configured to establish a first plurality of channel connections, each of the first plurality of channel connections being established between one of the first plurality of ATM communication channels and one of the first channel ports, and
the local interface and expansion interface further configured to establish a second plurality of channel connections, each of the second plurality of channel connections being established between one of the second plurality of ATM communication channels and one of the second channel ports.

46. The system of claim 45, wherein each of the first plurality of ATM communication channels is adapted to carry priority data traffic and each of the second plurality of ATM communication channels is adapted to carry non-priority data traffic.

47. The system of claim 46, wherein the priority data traffic is real-time traffic and the non-priority data traffic is non-real-time traffic.

48. The system of claim 47, wherein the priority data traffic corresponds to any of the following group of ATM service categories: constant bit rate (CBR), real-time variable bit rate (rt-VBR), non-real-time variable bit rate (nrt-VBR), available bit rate (ABR), unspecified bit rate (UBR), and combinations thereof.

49. The system of claim 45, wherein the local interface and the expansion interface conform to Universal Test and Operations Physical Interface (UTOPIA) level 2 specification.

50. The system of claim 45, wherein each of the plurality of physical layer devices is adapted to communicate via the first and second communication channels with an external physical layer device.

51. The system of claim 45, further comprising an ATM switch that provides the plurality of communication channels to the ATM layer device.

52. The system of claim 51, wherein the ATM switch is implemented in a digital subscriber line access multiplexer (DSLAM).

53. A communication system, comprising:
- an ATM layer means for receiving a plurality of ATM communication channels, each of the plurality of ATM communication channels corresponding to a first class of service or a second class of service;
- a plurality of physical layer means, each for communicating with an external physical layer device via a first communication channel associated with the first class of service and a second communication channel associated with the second class of service; and
- a communication means for interfacing the ATM layer means and the plurality of physical layer means, the communication means establishing a plurality of first class connections, each first class connection being between one of the ATM communications channels and one of the first channel ports, all of the first class connections using a single address on the local interface, the communication means establishing a plurality of second class connections, each second class connection being between one of the ATM communications channels and one of the second channel ports, each of the second class connections having a unique address on the local interface.

54. The system of claim 53, wherein each of the plurality of physical layer means is adapted to carry priority data traffic via the first communication channel and non-priority traffic via the second communication channel.

55. The system of claim 54, wherein the priority data traffic is real-time traffic and the non-priority data traffic is non-real-time traffic.

56. The system of claim 54, wherein the priority data traffic corresponds to any of the following group of ATM service categories: constant bit rate (CBR), real-time variable bit rate (rt-VBR), non-real-time variable bit rate (nrt-VBR), available bit rate (ABR), unspecified bit rate (UBR), and combinations thereof.

57. The system of claim 53, further comprising an ATM switch that provides the plurality of communication channels to the ATM layer device.

58. The system of claim 57, wherein the ATM switch is implemented in a digital subscriber line access multiplexer (DSLAM).

59. The system of claim 53, wherein each of the plurality of physical layer devices provides digital subscriber loop services to a corresponding external physical layer device.

* * * * *

UNITED STATES PATENT AND TRADEMARK OFFICE
CERTIFICATE OF CORRECTION

PATENT NO. : 7,023,829 B1
APPLICATION NO. : 09/871351
DATED : April 4, 2006
INVENTOR(S) : Holmquist et al.

Page 1 of 1

It is certified that error appears in the above-identified patent and that said Letters Patent is hereby corrected as shown below:

Column 8:
Line 46, delete "22" and insert "24".
Line 49, delete "22" and insert "24".
Line 51, delete "18" and insert "14".
Line 56, delete "24" and insert "22".
Line 63, delete "24" and insert "22".

Signed and Sealed this

Fifteenth Day of August, 2006

JON W. DUDAS
*Director of the United States Patent and Trademark Office*